United States Patent [19]
Saito et al.

[11] Patent Number: 4,865,924
[45] Date of Patent: Sep. 12, 1989

[54] MAGNETIC RECORDING MEDIUM

[75] Inventors: Shinji Saito; Chiaki Mizuno; Toshio Ono; Hiroshi Ogawa, all of Kanagawa, Japan

[73] Assignee: Fuji Photo Film Co., Ltd., Kanagawa, Japan

[21] Appl. No.: 183,952

[22] Filed: Apr. 20, 1988

[30] Foreign Application Priority Data

Apr. 20, 1987 [JP] Japan .................................. 62-96806

[51] Int. Cl.$^4$ ............................................... G11B 5/64
[52] U.S. Cl. .................................... 428/694; 428/329; 428/900
[58] Field of Search ................ 428/329, 695, 694, 900

[56] References Cited

U.S. PATENT DOCUMENTS

| 4,246,316 | 1/1981 | Aonuma | 428/329 |
| 4,265,931 | 5/1981 | Tamai | 428/900 |
| 4,439,795 | 3/1984 | Kitamoto | 428/900 |
| 4,511,617 | 4/1985 | Hideyama | 428/329 |

Primary Examiner—Paul J. Thibodeau
Attorney, Agent, or Firm—Sughrue, Mion, Zinn, Macpeak & Seas

[57] ABSTRACT

A magnetic recording medium comprises a nonmagnetic support, a first magnetic recording layer and a second magnetic recording layer, superposed in order, wherein each of binders contained in said first and second magnetic recording layers comprises a polymer, and the polymer contained in the second magnetic recording layer has a polymerization degree of not less than 250, said polymerization degree being more than that of the polymer contained in the first magnetic recording layer by at least as much as 20.

6 Claims, No Drawings

MAGNETIC RECORDING MEDIUM

BACKGROUND OF THE INVENTION

1. Field of the Invention

The present invention relates to a magnetic recording medium comprising a nonmagnetic support and a magnetic recording layer, and more particularly to a magnetic recording medium comprising a nonmagnetic support and a magnetic recording layer consisting of at least two layers.

2. Description of Prior Art

A magnetic recording medium has been widely used as a tape for recording music (i.e., an audio tape), a video tape and a floppy disc. The magnetic recording medium basically comprises a nonmagnetic support and a magnetic recording layer provided on the support, and the magnetic recording layer comprises a binder and a ferromagnetic powder dispersed therein.

The magnetic recording medium is desired to show high levels in various properties such as electromagnetic conversion characteristics, running endurance and running property. Particularly, the recording medium is desired to show excellent electromagnetic conversion characteristics. For example, an audio tape is required to have high reproducibility of original sounds, and a video tape is required to have high reproducibility of original images. Such high electromagnetic conversion characteristics is desired particularly in the case of an 8 mm type-video tape recorder.

It is known that the electromagnetic conversion characteristics of the magnetic recording medium using a ferromagnetic powder greatly varies depending upon dispersibility (or dispersed condition) of the ferromagnetic powder in the magnetic recording layer. In more detail, even if a ferromagnetic powder having excellent magnetic property is used for the purpose of enhancing the electromagnetic conversion characteristics of the resulting medium, the excellent magnetic property of the ferromagnetic powder is not reflected on the enhancement of the electromagnetic conversion characteristics when the ferromagnetic powder is poorly dispersed in the recording layer.

For improving the dispersibility of the ferromagnetic powder in the magnetic recording layer, there has been utilized a method of kneading or dispersing the ferromagnetic powder for a long period of time in the preparation of a magnetic paint for forming a magnetic recording layer. However, such long-time kneading or dispersing causes deterioration of the magnetic property of the ferromagnetic powder, and hence a measure of incorporating a polar group into a resin component used in a binder of a recording layer is recently utilized so as to make the binder show a favorable affinity for the ferromagnetic powder.

For example, Japanese Patent Provisional Publication No. 59(1984)-5424 discloses a magnetic recording medium in which a resin component having a specific polar group such as a metal sulfonate group is employed in an amount of not less than 50 wt.% as a binder of the recording layer using a ferromagnetic metal powder. By employing such resin having a specific polar group as a resin component of the binder, the ferromagnetic metal powder can be well dispersed in the magnetic recording layer, whereby the resulting recording medium can be highly improved in the electromagnetic conversion characteristics.

With respect to the molecular weight of a resin used in a binder, even for the above-mentioned resins having a specific polar group, it is known that a resin of low-molecular weight can better disperse the ferromagnetic metal powder therein and thereby improve the electromagnetic conversion characteristics of the resulting medium, as compared with other resins of high-molecular weight.

It is possible to prepare a magnetic recording medium improved in the electromagnetic conversion characteristics to a certain level as described above. However, further improvement of magnetic recording medium in both of the electromagnetic conversion characteristics and the running endurance is desired so far.

SUMMARY OF THE INVENTION

It is an object of the present invention to provide a magnetic recording medium such as an audio tape or a video tape which is improved in both of electromagnetic conversion characteristics and running endurance.

There is provided by the present invention a magnetic recording medium comprising a nonmagnetic support, a first magnetic recording layer and a second magnetic recording layer, superposed in order, wherein each of binders contained in said first and second magnetic recording layers comprises a polymer, and the polymer contained in the second magnetic recording layer has a polymerization degree of not less than 250, said polymerization degree being more than that of the polymer contained in the first magnetic recording layer by at least as much as 20.

As described above, the magnetic recording medium of the invention has at least two magnetic recording layers (i.e. an upper magnetic recording layer and a lower magnetic recording layer). The lower magnetic recording layer contains a binder comprising a polymer having a low polymerization degree and the upper magnetic recording layer contains a binder comprising a polymer having a high polymerization degree. The magnetic recording medium having the above-described constitution is excellent in the electromagnetic conversion characteristics, particularly in the low-frequency range, as well as the running endurance, and hence the recording medium is satisfactory in practical use.

The above-mentioned various properties can be much more enhanced by employing a vinyl chloride copolymer as the polymer according to the invention.

DETAILED DESCRIPTION OF THE INVENTION

The magnetic recording medium of the present invention basically comprises a nonmagnetic support and a magnetic recording layer consisting two layers (i.e., a first magnetic recording layer and a second magnetic recording layer) provided on the support. Each of the two magnetic recording layers comprises a binder and a ferromagnetic powder dispersed therein.

As the nonmagnetic support employable in the invention, there can be mentioned films or sheets of synthetic resins such as polyester resins (e.g., polyethylene terephthalate (PET) and polyethylene naphthalate), polyolefin resins (e.g., polypropylene), cellulose derivatives (e.g., cellulose diacetate and cellulose triacetate), vinyl resns (e.g., polyvinyl chloride and polyvinylidene chloride), polycarbonate, polyamide, polyamideimide, polyimide; metallic foils such as aluminum foil and stainless steel foil; papers; and ceramic sheets.

The thickness of the nonmagnetic support is preferably in the range of 10 to 55 μm.

The binder to be contained in the first magnetic recording layer (i.e., lower magnetic recording layer) is required to comprise a polymer having a polymerization degree of not less than 250, and the binder to be contained in the second magnetic recording layer (i.e., upper magnetic recording layer) is required to comprise a polymer having a polymerization degree more than that of the polymer contained in the first magnetic recording layer by at least as much as 20. The polymer contained in the second magnetic recording layer preferably has a polymerization degree more than that of the polymer contained in the first magnetic recording layer by at least as much as 50, more preferably at least as much as 100.

The polymer having a low polymerization degree which is contained in the lower magnetic recording layer can improve the dispersibility of the ferromagnetic powder in the recording layer to increase a filling ratio of the ferromagnetic powder in the recording layer as well as a squareness ratio thereof. Moreover, the employment of the polymer having a low polymerization degree for the lower recording layer makes it possible to enhance molding property of the resulting sheet in a supercalendering treatment, whereby satisfactory surface condition can be given to the recording medium. When the polymerization degree of the polymer to be contained in the lower recording layer is too high, the ferromagnetic powder is poorly dispersed in the recording layer, so that the polymerization degree thereof is preferably not more than 500.

The polymer having a high polymerization degree which is contained in the second magnetic recording layer is thought to contribute the running endurance and suitability for practical use of the resulting recording medium, and the polymerization degree thereof is preferably not less than 300.

Examples of the polymers suitably employed for the formation of each magnetic recording layer include vinyl chloride copolymers such as vinyl chloride/vinyl acetate copolymer, vinyl chloride/vinyl acetate/vinyl alcohol copolymer, vinyl chloride/vinyl acetate/acrylic acid copolymer, vinyl chloride/vinylidene chloride copolymer, vinyl chloride/acrylonitrile copolymer and ethylene/vinyl acetate copolymer. Preferred are vinyl chloride copolymers having a polar group such as a hydroxyl group, a carboxyl group, an epoxy group, a metal sulfonate group, a phosphoric group and a phosphoric acid ester group.

As the binder component, other resin component can be also employed in addition to the above-mentioned polymers. Examples of the resin components include cellulose derivatives such as a nitrocellulose resin, acrylic resins, polyvinyl acetal resins, polyvinyl butyral resins, epoxy resins, phenoxy, resins, and polyurethane resins (e.g., a polyester polurethane resin, a polyurethane resin incorporated with a polar group such as —SO₃Na or —SO₂Na and a polycarbonate polyurethane resin). These resins can be employed singly or in combination.

When a curing agent is used as a component for forming a magnetic recording layer, a polyisocyanate compound is generally employed as the curing agent. As the polyisocyanate compound, there can be mentioned those conventionally employed. Examples of the polyisocyanate compounds include reaction products of tolylene diisocyanate and 1 mole of trimethylolpropane (e.g., Desmodule L-75, trade name, available from Bayer AG), reaction products of 3 moles of diisocyanate such as xylene diisocyanate or hexamethylene diisocyanate and 1 mole of trimethylolpropane, burette adducts of 3 moles of hexamethylene diisocyanate, isocyanurate compounds of 5 moles of tolylene diisocyanate, isocyanurate adduct compounds of 3 moles of tolylene diisocyanate and 2 moles of hexamethylene diisocyanate, isophorone diisocyanurate, and polymers of diphenylmethane diisocyanate.

In the case of the subjecting the resulting magnetic recording layer to a curing treatment by irradiating with electron beam, a compound having a reactive double bond such as urethane acrylate can be employed.

In the invention, it is preferred to employ a combination of a resin having high hardness such as a vinyl chloride copolymer and a resin having a low hardness such as a polyurethane resin as a resin component of the binder. In the case of using a resin having a high hardness such as a vinyl chloride copolymer in combination with a resin having a low hardness such as a polyurethane resin, the ratio between the former and the latter is generally in the range of 9 : 1 to 5 : 5, preferably 9 : 1 to 6 : 4, by weight.

In the case of using a ferromagnetic powder of low hardness such as a ferromagnetic metal powder, the binder is generally used in a larger amount than the case of using a ferromagnetic powder of high hardness such as $\gamma$-$Fe_2O_3$, and in this case, the amount of the resin having a low hardness such as a polyurethane resin is generally increased. The increase of the resin having a low hardness such as a polyurethane resin is apt to soften the binder, so that the amount of the curing agent such as a polyisocyanate compound is generally increased to adjust the hardness of the binder.

When the polyurethane resin is used as a resin component and the polyisocyanate compound is used as a curing agent, the ratio between the polyurethane resin and the polyisocyanate compound is generally in the range of 1 : 0.8 to 1 : 2 (polyurethane resin : polyisocyanate compound, by weight), preferably in the range of 1 : 1 to 1 : 1.5. By setting the ratio therebetween in the above-defined range, the binder is effectively prevented from softening caused by the employment of polyurethane resin in a large amount, even in the case of using a ferromagnetic metal powder having a low hardness.

The total amount of the resin component and the curing agent is generally in the range of 5 to 40 by weight, preferably 10 to 20 by weight, per 100 parts by weight of the ferromagnetic powder.

Examples of the ferromagnetic powder employable in the invention include a metal oxide type-ferromagnetic powder such as $\gamma$-$Fe_2O_3$, a modified metal oxide type-ferromagnetic powder such as $\gamma$-$Fe_2O_3$ containing cobalt, and a ferromagnetic metal powder containing iron, cobalt, nickel, etc.

The ferromagnetic metal powder employable in the invention preferably contains iron, cobalt or nickel and has a specific surface area of not less than 42 $m^2/g$, more preferably not less than 45 $m^2/g$.

As a typical ferromagnetic metal powder, there can be mentioned a ferromagnetic alloy powder containing a metal component of at least 75 wt.% in which at least 80 wt.% of the metal component comprises at least one ferromagnetic metal or metal alloy (e.g., Fe, Co., Ni, Fe-Co, Fe-Ni, Co-Ni and Co-Ni-Fe) and the remaining metal component, if present, comprises other atom(s)

(e.g., Si, S, Sc, Ti, Cr, Mn, Cu, Zn, Y, Mo, Rh, Pd, Ag, W, Sn, Sb, B, Te, Ba, Ta, Re, P, Au, Hg, Bi, La, Ce, Pr, Nd, Pd, Zn). The ferromagnetic metal powder may contain a small amount hydroxide or oxide.

Methods of the preparation of a ferromagnetic powder are already known, and the ferromagnetic powder employed in the invention can be prepared according to the known methods.

There is no specific limitation on the shape of the ferromagnetic powder employable in the invention, but normally used is a ferromagnetic powder in a needle shape, grain shape, dice shape, rice shape or plate shape. Preferred is a ferromagnetic metal powder in a needle shape.

A process for the preparation of a magnetic recording medium according to the present invention is described hereinafter.

In the first place, the above-mentioned resin component, curing agent and ferromagnetic powder for the first magnetic recording layer are kneaded with a solvent which is conventionally used for the preparation of a magnetic paint such as methyl ethyl ketone, dioxane, cyclohexane and ethyl acetate, to prepare a magnetic paint (dispersion) for the formation of a first magnetic recording layer. The kneading can be carried out according to a known method. A magnetic paint for the formation of a second magnetic recording layer can be prepared by the same manner as described above using components for the second magnetic recording layer.

The magnetic paint for the formation of each recording layer may contain a variety of additives or fillers such as an abrasive (e.g., $\alpha$-$Al_2O_3$ and $Cr_2O_3$), an antistatic agent (e.g., carbon black), a lubricant (e.g., fatty acid, fatty acid ester and silicon oil) and a dispersing agent other than the above-mentioned components.

In the second place, the magnetic paint for the formation of a first magnetic recording layer is coated over the nonmagnetic support, and on the coated layer of the magnetic paint is then coated the magnetic paint for the formation of a second magnetic recording layer.

The coating procedure can be carried out by a conventional coating method such as a method of using a reverse roll.

Each magnetic paint for the formation of the first and second magnetic recording layers is coated in such a manner that the total thickness of the first magnetic recording layer and the second magnetic recording layer would be in the range of 0.5 to 10 $\mu$m.

In the magnetic recording medium of the invention, a back layer (or backing layer) may be provided on a surface of the nonmagnetic support where a magnetic recording layer is not coated. The back layer is generally formed on the support by coating a solution containing a particulate component such as an abrasive or an antistatic agent and a binder dispersed in an organic solvent over the surface of the support not facing the magnetic recording layer.

An adhesive layer may be also provided between the nonmagnetic support and the magnetic recording layer or between the nonmagnetic support and the back layer.

The coated layers of the magnetic paints for the formation of first and second magnetic recording layers are generally subjected to orienting the ferromagnetic powder contained in the coated layers, that is, a magnetic orientation, and then subjected to drying.

After the drying, the resulting laminated sheet is subjected to a surface smoothing process using for example a supercalender roll. Through the surface smoothing process, voids having been produced by removal of the solvent in the drying procedure disappear to increase a filling ratio of the ferromagnetic powder in the recording layer, whereby the resulting magnetic recording medium is improved in the electromagnetic conversion characteristics.

Subsequently, the laminated sheet is cut or slit into a desired shape using a known cutting or slitting device such as a slitter under conventional conditions.

The examples and the comparison examples of the present invention are given below. In the following examples, the expression "part(s)" means "part(s) by weight", unless otherwise specified.

EXAMPLE 1

| Composition of Magnetic Paint for First Magnetic Recording Layer | |
|---|---|
| Co-containing $\gamma$-$Fe_2O_3$ (Hc: 560 Oe, s: 75 emu/g, specific surface area: 30 $m^2$/g) | 100 parts |
| Vinyl chloride/vinyl acetate/vinyl alcohol copolymer (copolymerization ratio: 91:3:6, polymerization degree: 250) | 15 parts |
| Polyester polyurethane resin (Crisbon 7209, available from Dainippon Ink & Chemicals Inc.) | 5 parts |
| Lauric acid | 3 parts |
| Butyl acetate | 300 parts |
| Composition of Magnetic Paint for Second Magnetic Recording Layer | |
| Co-containing $\gamma$-$Fe_2O_3$ (Hc: 700 Oe, s: 73 emu/g, specific surface area: 40 $m^2$/g) | 100 parts |
| Vinyl chloride/vinyl acetate/vinyl alcohol copolymer (copolymerization ratio: 91:3:6, polymerization degree: 300) | 15 parts |
| Polyester polyurethane resin (Crisbon 7209, available from Dainippon Ink & Chemicals Inc.) | 5 parts |
| Lauric acid | 3 parts |
| $\alpha$-$Al_2O_3$ | 1 part |
| Butyl acetate | 300 parts |

The components of each composition indicated above were kneaded in a sand mill to give two kinds of dispersions. Each of the dispersions was filtrated over a filter having a mean pore size of 1 $\mu$m, to prepare a magnetic paint for the formation of a first magnetic recording layer and a magnetic paint for the formation of a second magnetic recording layer.

The magnetic paint for the formation of a first magnetic recording layer is coated over a polyethylene terephthalate support (thickness: 7 $\mu$m) under running of the support at a speed of 60 m/min by means of a reverse roll, to give a coated layer of the magnetic paint having thickness of 3.0 $\mu$m (in dry state). On the coated layer of the magnetic paint for the formation of a first magnetic recording layer is then coated the magnetic paint for the formation of a second magnetic recording layer by means of a reverse roll, to give a coated layer having thickness of 1.5 $\mu$m (in dry state). The nonmagnetic support with the coated layers of the magnetic paints was treated with an electromagnet at 3,000 gauss while the coated layers were wet, and then successively subjected to a drying process and a supercalendering. The resulting sheet was slit to give an audio tape having a width of 3.81 mm.

EXAMPLE 2

The procedure of Example 1 was repeated except for varying the polymerization degree of the vinyl chloride/vinyl acetate/vinyl alcohol copolymer used in the preparation of a magnetic paint for the first magnetic recording layer from 250 to 200, to prepare an audio tape.

EXAMPLE 3

The procedure of Example 1 was repeated except for varying the polymerization degree of the vinyl chloride/vinyl acetate/vinyl alcohol copolymer used in the preparation of a magnetic paint for the first magnetic recording layer from 250 to 350 and further varying the polymerization degree of the vinyl chloride/vinyl acetate/vinyl alcohol copolymer used in the preparation of a magnetic paint for the second magnetic recording layer from 300 to 400, to prepare an audio tape.

EXAMPLE 4

The procedure of Example 1 was repeated except for varying the polymerization degree of the vinyl chloride/vinyl acetate/vinyl alcohol copolymer used in the preparation of a magnetic paint for the first magnetic recording layer from 250 to 300 and further varying the polymerization degree of the vinyl chloride/vinyl acetate/vinyl alcohol copolymer used in the preparation of a magnetic paint for the second magnetic recording layer from 300 to 400, to prepare an audio tape.

COMPARISON EXAMPLE 1

The procedure of Example 1 was repeated except for varying the polymerization degree of the vinyl chloride/vinyl acetate/vinyl alcohol copolymer used in the preparation of a magnetic paint for the first magnetic recording layer from 250 to 300, to prepare an audio tape.

COMPARISON EXAMPLE 2

The procedure of Example 1 was repeated except for varying the polymerization degree of the vinyl chloride/vinyl acetate/vinyl alcohol copolymer used in the preparation of a magnetic paint for the first magnetic recording layer from 250 to 400, to prepare an audio tape.

The audio tapes obtained in Examples 1 to 4 and Comparison Examples 1 and 2 were evaluated on the maximum output level at 315 Hz (MOL), lowering of output and occurrence of stain on a magnetic head according to the following tests.

The results of the evaluations are set forth in Table 1.

MAXIMUM OUTPUT LEVEL (MOL)

A signal of 315 Hz was recorded on the audio tape, and the recorded signal was reproduced using a commercial tape deck (582 type-tape deck, produced by Nakamichi Co., Ltd.) to measure its maximum output level (MOL). The maximum output level is expressed by a relative value based on the MOL value of a commercial audio tape (FR-II of Fuji Photo Film Co., Ltd.) at high position being O dB.

LOWERING OF OUTPUT

A signal for 60 minutes was recorded on the audio tape, and the recorded signal was repeatedly reproduced at 10 times using a commercial tape deck (582 type-tape deck, produced by Nakamichi Co., Ltd.), to measure reproduction output in each reproduction. Lowering of output of the audio tape was evaluated by expressing the reproduction output measured at the last reproduction by a relative value based on the reproduction output measured at the first reproduction being O dB.

OCCURRENCE OF STAIN ON HEAD

A signal for 60 minutes was recorded on the audio tape, and the recorded signal was repeatedly reproduced at 10 times using a commercial tape deck (582 type-tape deck, produced by Nakamichi Co., Ltd.). Thereafter, occurrence of stain on a magnetic head equipped in the tape deck was observed through eye judgment.

TABLE 1

| | Polymerization Degree of Copolymer | | MOL (dB) | Stain on Head | Lowering of Output |
|---|---|---|---|---|---|
| | First Layer | Second Layer | | | |
| Example 1 | 250 | 300 | 0.7 | none | −1.5 |
| Example 2 | 200 | 300 | 1.0 | none | −1.0 |
| Example 3 | 350 | 400 | 0.2 | none | −0.0 |
| Example 4 | 300 | 400 | 0.3 | none | −0.0 |
| Com. Ex. 1 | 300 | 300 | 0.3 | observed | −4.0 |
| Com. Ex. 2 | 400 | 300 | 0.0 | observed | −5.0 |

In Table 1, the term "Copolymer" means a vinyl chloride/vinyl acetate/vinyl alcohol copolymer used in the preparation of a magnetic paint for forming a first magnetic recording layer or a second magnetic recording layer, and the terms "First Layer" and "Second Layer" mean a first magnetic recording layer and a second magnetic recording layer, respectively.

As is evident from the results set forth in Table 1, the audio tape in which the first magnetic recording layer (lower recording layer) and the second magnetic recording layer (upper recording layer) had the same polymerization degree of the vinyl chloride/vinyl acetate/vinyl alcohol copolymer as each other (Comparison Example 1) and the audio tape in which the polymerization degree of the copolymer in the first magnetic recording layer was higher than that in the second magnetic recording layer (Comparison Example 2) were both markedly lowered in the output level and thereby deteriorated in the running endurance, as compared with the audio tapes of the present invention (Examples 1 to 4). Further, those tapes of comparison examples caused staining on the magnetic head, and showed unsatisfactory maximum output level at 315 Hz, resulting in insufficient frequency properties in the low frequency range.

On the other hand, each of the audio tapes of the invention (Examples 1 to 4) in which the polymerization degree of the vinyl chloride/vinyl acetate/vinyl alcohol copolymer in the first magnetic recording layer was lower than that in the second magnetic recording layer showed satisfactory results in all properties such as the maximum output level, lowering of output and occurrence of stain on the head, although they slightly vary depending on the polymerization degree of the employed copolymer or the difference between the polymerization degree of the copolymer in the first magnetic recording layer and that in the second magnetic recording layer.

EXAMPLE 5

| Composition of Magnetic Paint for First Magnetic Recording Layer | |
| --- | --- |
| Co-containing $\gamma$-Fe$_2$O$_3$ (Hc: 600 Oe, s: 74 emu/g, specific surface area: 30 m$^2$/g) | 100 parts |
| Vinyl chloride/vinyl acetate/vinyl alcohol copolymer (copolymerization ratio: 87:8:5, polymerization degree: 250) | 10 parts |
| Polyester polyurethane resin (Crisbon 7209, available from Dainippon Ink & Chemicals Inc.) | 5 parts |
| Stearic acid | 3 parts |
| Butyl stearate | 1 part |
| Polyisocyanate (Colonate L-75, available from Nippon Polyurethane Co., Ltd.) | 5 parts |
| Butyl acetate | 300 parts |
| Composition of Magnetic Paint for Second Magnetic Recording Layer | |
| Co-containing $\gamma$-Fe$_2$O$_3$ (Hc: 750 Oe, s: 73 emu/g, specific surface area: 40 m$^2$/g) | 100 parts |
| Vinyl chloride/vinyl acetate/vinyl alcohol copolymer (copolymerization ratio: 87:8:5, polymerization degree: 400) | 10 parts |
| Polyester polyurethane resin (Crisbon 7209, available from Dainippon Ink & Chemicals Inc.) | 5 parts |
| Stearic acid | 3 parts |
| Butyl stearate | 1 part |
| $\alpha$-Al$_2$O$_3$ | 1 part |
| Polyisocyanate (Colonate L-75, available from Nippon Polyurethane Co., Ltd.) | 5 parts |
| Butyl acetate | 300 parts |

The components of each composition indicated above excluding the polyisocyanate were kneaded in a sand mill to prepare two kinds of dispersions. To each of the dispersions was added polyisocyanate and thery were mixed for 20 minutes. The obtained dispersion was filtrated over a filter having a mean pore size of 1 $\mu$m, to prepare a magnetic paint for the formation of a first magnetic recording layer and a magnetic paint for the formation of a second magnetic recording layer.

The magnetic paint for the formation of a first magnetic recording layer is coated over a polyethylene terephthalate support (thickness: 15 $\mu$m) under running of the support at a speed of 60 m/min by means of a reverse roll, to give a coated layer of the magnetic paint having thickness of 3.0 $\mu$m (in dry state). On the coated layer of the magnetic paint for the formation of a first magnetic recording layer is then coated the magnetic paint for the formation of a second magnetic recording layer by means of a reverse roll, to give a coated layer having thickness of 1.5 $\mu$m (in dry state). The nonmagnetic support with the coated layers of the magnetic paints was treated with an electromagnet a 3,000 gauss while the coated layers were wet, and then successively subjected to a drying process and a supercalendering. The resulting sheet was slit to give a video tape having a width of ½ inch.

EXAMPLE 6

The procedure of Example 5 was repeated except for varying the polymerization degree of the vinyl chloride/vinyl acetate/vinyl alcohol copolymer used in the preparation of a magnetic paint for the first magnetic recording layer from 250 to 200 and further varying the polymerization degree of the vinyl chloride/vinyl acetate/vinyl alcohol copolymer used in the preparation of a magnetic paint for the second magnetic recording layer from 400 to 300, to prepare a video tape.

EXAMPLE 7

The procedure of Example 5 was repeated except for varying the polymerization degree of the vinyl chloride/vinyl acetate/vinyl alcohol copolymer used in the preparation of a magnetic paint for the first magnetic recording layer from 250 to 350, to prepare a video tape.

EXAMPLE 8

The procedure of Example 5 was repeated except for varying the polymerization degree of the vinyl chloride/vinyl acetate/vinyl alcohol copolymer used in the preparation of a magnetic paint for the first magnetic recording layer from 250 to 300, to prepare a video tape.

COMPARISON EXAMPLE 3

The procedure of Example 5 was repeated except for varying the polymerization degree of the vinyl chloride/vinyl acetate/vinyl alcohol copolymer used in the preparation of a magnetic paint for the first magnetic recording layer from 250 to 300 and further varying the polymerization degree of the vinyl chloride/vinyl acetate/vinyl alcohol copolymer used in the preparation of a magnetic paint for the second magnetic recording layer from 300 to 300, to prepare a video tape.

COMPARISON EXAMPLE 4

The procedure of Example 5 was repeated except for varying the polymerization degree of the vinyl chloride/vinyl acetate/vinyl alcohol copolymer used in the preparation of a magnetic paint for the first magnetic recording layer from 250 to 400 and further varying the polymerization degree of the vinyl chloride/vinyl acetate/vinyl alcohol copolymer used in the preparation of a magnetic paint for the second magnetic recording layer from 400 to 300, to prepare a video tape.

The video tapes obtained in Examples 5 to 8 and Comparison Examples 3 and 4 were evaluated on video output, still life in a still mode and occurrence of stain on a magnetic head according to the following tests.

The results of the evaluations are set forth in Table 2.

VIDEO OUTPUT

A signal of 629 kHz was recorded on the video tape, and the recorded signal was reproduced to measure video output. The video output was expressed by a relative value based on a value of the video output of a commercial VHS type-video cassette tape (Super HG of Fuji Photo Film Co., Ltd.) being 0 db.

STILL LIFE

The video tape was run in a still mode using a commercial video tape recorder of VHS type, to measure a term (i.e., still life) at the end of which the video output was decreased by 6 dB.

OCCURRENCE OF STAIN ON HEAD

A signal for 60 minutes was recorded on the video tape using a commercial video tape recorder of VHS type, and the recorded signal was repeatedly reproduced at 10 times. Thereafter, occurrence of stain on a magnetic head equipped in the tape deck was observed through eye judgement.

TABLE 2

| | Polymerization Degree of Copolymer | | Video Output (dB) | Stain on Head | Still Life (min.) |
| --- | --- | --- | --- | --- | --- |
| | First Layer | Second Layer | | | |
| Example 5 | 250 | 300 | 1.0 | none | 100 |
| Example 6 | 200 | 300 | 1.2 | none | 100 |
| Example 7 | 350 | 400 | 0.4 | none | 120 |
| Example 8 | 300 | 400 | 0.4 | none | 120 |
| Com. Ex. 3 | 300 | 300 | 0.4 | observed | 80 |
| Com. Ex. 4 | 400 | 300 | 0.0 | observed | 60 |

In Table 1, the term "Copolymer" means a vinyl chloride/vinyl acetate/vinyl alcohol copolymer used in the preparation of a magnetic paint for forming a first magnetic recording layer or a second magnetic recording layer, and the terms "First Layer" and "Second Layer" mean a first magnetic recording layer and a second magnetic recording layer, respectively.

As is evident from the results set forth in Table 1, the video tape in which the first magnetic recording layer (lower recording layer) and the second magnetic recording layer (upper recording layer) had the same polymerization degree of the vinyl chloride/vinyl acetate/vinyl alcohol copolymer as each other (Comparison Example 3) and the video tape in which the polymerization degree of the copolymer in the first magnetic recording layer was higher than that in the second magnetic recording layer (Comparison Example 4) both had an extremely shorter still life and thereby deteriorated in the running endurance, as compared with the video tapes of the present invention (Examples 5 to 8). Further, those tapes of comparison examples caused staining on the magnetic head, and showed low video output, resulting in unsatisfactory electromagnetic conversion characteristics.

On the other hand, each of the audio tapes of the invention (Examples 5 to 8) in which the polymerization degree of the vinyl chloride/vinyl acetate/vinyl alcohol copolymer in the first magnetic recording layer (lower recording layer) was lower than that in the second magnetic recording layer (upper recording layer) showed satisfactory results in all properties such as video output, occurrence of stain on the head and still life, although they slightly vary depending on the polymerization degree of the employed copolymer or the difference between the polymerization degree of the copolymer in the first magnetic recording layer and that in the second magnetic recording layer.

We claim:

1. A magnetic recording medium comprising a nonmagnetic support, a first magnetic recording layer and a second magnetic recording layer, superposed in order, wherein each of the binders contained in said first and second magnetic recording layers comprises a combination of a vinyl chloride copolymer and another polymer in a ratio in the range of 9:1 to 5:5, by weight, and the copolymer contained in the first magnetic recording layer has a polymerization degree of not more than 500 and the copolymer contained in the second magnetic recording layer has a polymerization degree of not less than 250, said polymerization degree of the copolymer contained in the second magnetic recording layer being more than that of the copolymer contained in the first magnetic recording layer by at least as much as 20.

2. The magnetic recording medium as claimed in claim 1, wherein the polymerization degree of the polymer contained in the second magnetic recording layer is more than that of the polymer contained in the first magnetic recording layer by at least as much as 50.

3. The magnetic recording medium as claimed in claim 1, wherein the polymerization degree of the polymer contained in the second magnetic recording layer is more than that of the polymer contained in the first magnetic recording layer by at least as much as 100.

4. The magnetic recording medium as claimed in claim 1, wherein another polymer employed in combination with the vinyl chloride copolymer is a resin selected from the group consisting of nitrocellulose resin, acrylic resin, polyvinyl acetal resin, polyvinyl butyral resin, epoxy resin, phenoxy resin and polyurethane resin.

5. The magnetic recording medium as claimed in claim 1, wherein another polymer employed in combination with the vinyl chloride copolymer is a polyester polyurethane resin.

6. The magnetic recording medium as claimed in claim 1, wherein the vinyl chloride copolymer is a resin selected from the group consisting of a vinyl chloride/vinyl acetate copolymer, a vinyl chloride/vinyl acetate/vinyl alcohol copolymer, a vinyl chloride/vinyl acetate/acrylic acid copolymer, a vinyl chloride/vinylidene chloride copolymer, and a vinyl chloride/acrylonitrile copolymer.

* * * * *